(12) United States Patent
Fernihough et al.

(10) Patent No.: US 9,829,503 B2
(45) Date of Patent: Nov. 28, 2017

(54) APPARATUSES, SYSTEMS, AND METHODS FOR ACCELEROMETERS

(71) Applicant: PGS Geophysical AS, Oslo (NO)

(72) Inventors: Robert Alexis Peregrin Fernihough, Austin, TX (US); Matthew Segsworth, Austin, TX (US)

(73) Assignee: PGS Geophysical AS, Oslo (NO)

( * ) Notice: Subject to any disclaimer, the term of this patent is extended or adjusted under 35 U.S.C. 154(b) by 185 days.

(21) Appl. No.: 14/820,787

(22) Filed: Aug. 7, 2015

(65) Prior Publication Data

US 2016/0097790 A1    Apr. 7, 2016

Related U.S. Application Data

(60) Provisional application No. 62/059,282, filed on Oct. 3, 2014.

(51) Int. Cl.
*G01P 15/093* (2006.01)
*G01H 9/00* (2006.01)
*G01V 1/18* (2006.01)

(52) U.S. Cl.
CPC .......... *G01P 15/093* (2013.01); *G01H 9/004* (2013.01); *G01V 1/18* (2013.01)

(58) Field of Classification Search
CPC .............................. G01P 15/093; G01H 9/004
See application file for complete search history.

(56) References Cited

U.S. PATENT DOCUMENTS

| 4,367,967 A | 1/1983 | Albert, Jr. |
| 5,633,960 A | 5/1997 | Lagakos et al. |
| 6,314,056 B1 | 11/2001 | Bunn et al. |
| 6,606,186 B2 | 8/2003 | Maas |
| 7,167,412 B2 | 1/2007 | Tenghamn |
| 7,222,534 B2 | 5/2007 | Maas et al. |
| 7,349,591 B2 * | 3/2008 | Maas ..................... G01P 1/023 250/227.14 |
| 7,447,113 B2 | 11/2008 | Martinez et al. |
| 7,671,598 B2 | 3/2010 | Ronaess et al. |
| 8,424,847 B2 | 4/2013 | Scott |
| 8,611,180 B2 | 12/2013 | Berg et al. |
| 8,645,071 B2 | 2/2014 | Fernihough |
| 2003/0011878 A1 | 1/2003 | Maas et al. |
| 2010/0226203 A1 | 9/2010 | Buttle et al. |
| 2012/0250457 A1 | 10/2012 | Rickert et al. |
| 2013/0028051 A1 | 1/2013 | Barkved et al. |
| 2014/0046599 A1 | 2/2014 | Smith et al. |

(Continued)

FOREIGN PATENT DOCUMENTS

EP    1821107    8/2007

OTHER PUBLICATIONS

European Search Report for related European Application No. 15187660.4, dated Jun. 8, 2016 (8 pgs).

(Continued)

*Primary Examiner* — John Chapman, Jr.

(57) ABSTRACT

According to one example, a system includes a flexural beam having a first face and a second face opposite the first face and a first coil of optical fiber coupled to the first face, where the first coil of optical fiber is encapsulated by a cured encapsulation composition, wherein the encapsulation composition has a viscosity from 30 to 300 millipascal-second at 25° C.

21 Claims, 5 Drawing Sheets

(56) References Cited

U.S. PATENT DOCUMENTS

| | | |
|---|---|---|
| 2014/0112094 A1 | 4/2014 | Fernihough |
| 2014/0160885 A1 | 6/2014 | Tenghamn |
| 2014/0185409 A1 | 7/2014 | Voldsbekk |
| 2014/0185410 A1 | 7/2014 | Voldsbekk |
| 2014/0185411 A1 | 7/2014 | Voldsbekk |
| 2014/0185412 A1 | 7/2014 | Voldsbekk |
| 2014/0238773 A1 | 8/2014 | Sallas et al. |
| 2014/0254310 A1 | 9/2014 | Voldsbekk |

OTHER PUBLICATIONS

Arkema Innovative Chemistry, "Paints and coatings / Delivering Innovative Products and Services to Coatings Formulators Worldwide," Arkema Innovative Chemistry, www.arkema.com, 12 pgs, [retrieved on Jul. 18, 2014 from the Internet <URL: http://www.arkema.com/export/shared/.content/nnedia/downloads/products-documentations/coatings/arkema-global-coatings-offer-2014.pdf>].
Dupont—Hytrel HTR8351 NC021 (Preliminary Data), "Thermoplastic Polyester Elastomer", DuPont, www.dupont.com, Revised Oct. 8, 2013, 2 pgs., [retrieved on Jul. 18, 2014 from the Internet <URL: http://dupont.materialdatacenter.com/profiler/material/pdf/datasheet/HytrelHTR8351NC021>].
Crompton Corp., "Polymer Modifiers—Polybond 3200 Chemically Modified Polyolefin," Crompton—Olefins & Styrenics, www.cromptoncorp.com, Revised Oct. 5, 2004, 2 pgs.
Crompton Corp., "Polymer Modifiers—Polybond 3000 Chemically Modified Polyolefin," Crompton—Olefins & Styrenics, www.cromptoncorp.com, Revised Oct. 5, 2004.
U.S. Appl. No. 14/452,211, filed Aug. 5, 2014, Titled: "Subsea Cable Having Floodable Optical Fiber Conduit" (16 pgs).

\* cited by examiner

APPARATUSES, SYSTEMS, AND METHODS FOR ACCELEROMETERS

CROSS-REFERENCE TO RELATED APPLICATIONS

This application claims priority to U.S. Provisional Application 62/059,282, filed Oct. 3, 2014, which is incorporated by reference.

BACKGROUND

Optical apparatuses can be utilized to sense parameters such as acceleration, motion and/or pressure, among others. For instance, optical apparatuses can be used to sense seismic energy. The seismic energy can be naturally occurring, or can be imparted by a seismic energy source for the purpose of performing seismic surveys, geophysical exploration, and/or permanent reservoir monitoring.

Sensing seismic energy can include detecting motion on and/or near the Earth's surface. Some optical apparatuses, such as geophones, can produce signals that are related to velocity. Some other optical apparatuses, such as accelerometers, can produce signals related to the time derivative of velocity, i.e., acceleration. Some other optical apparatuses, such as inclinometers, can produce signals related to a relative orientation of the device with respect to the Earth's gravitational pull. These optical apparatuses can generate an output signal in response to a detected physical parameter. The output optical signal can be a change for an input wavelength, a change in phase to a signal, or an interference pattern of the signal resulting in response to changes in the physical parameter.

DETAILED DESCRIPTION

Figure 1:
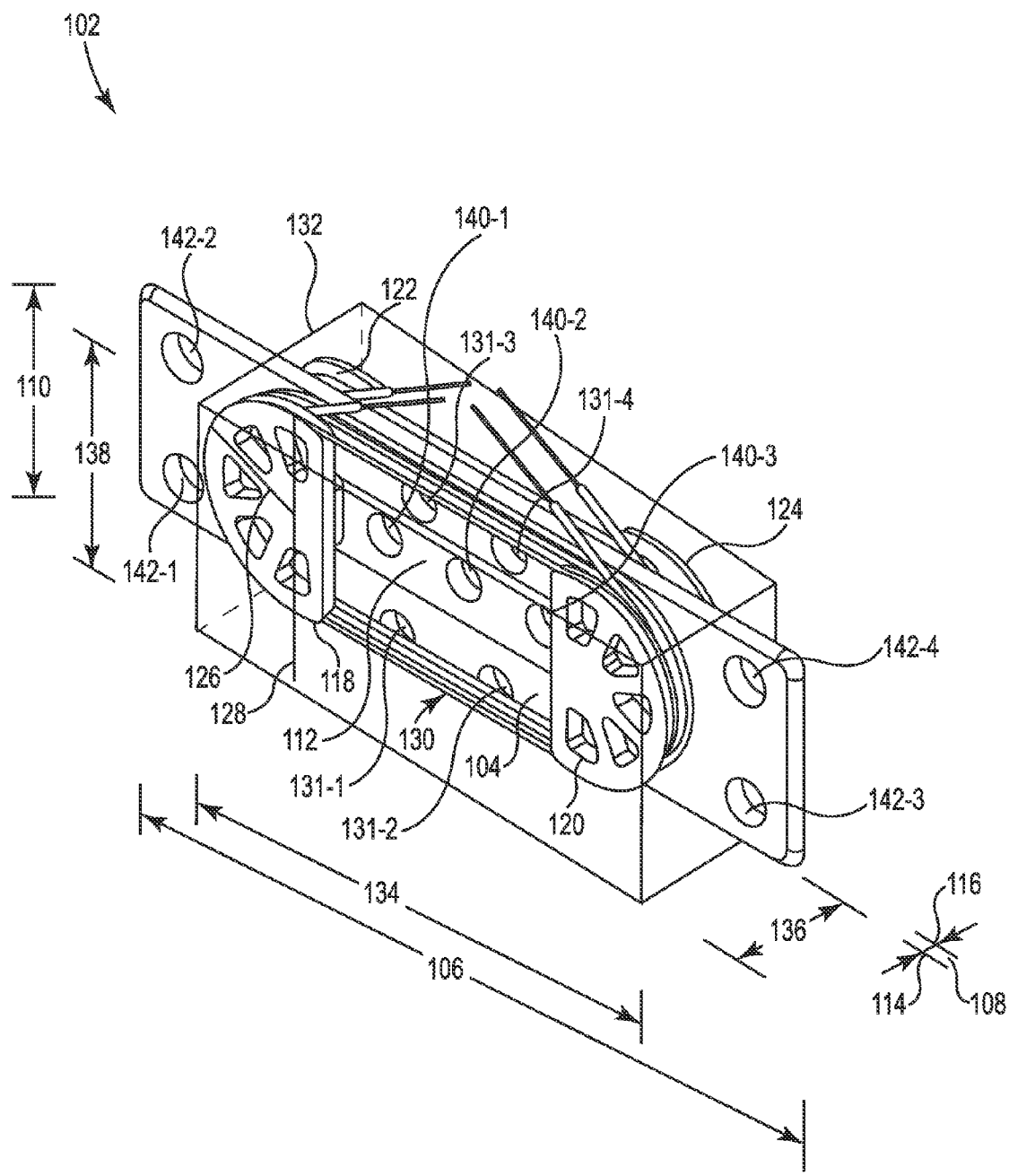
FIG. 1 illustrates an example of a portion of a system.

The present disclosure is related to apparatuses, systems, and methods for accelerometers. The disclosed apparatuses, systems, and methods for accelerometers can be utilized for geophysical surveying equipment, among other applications. The disclosed apparatuses, systems, and methods for accelerometers can help reduce costs and/or fabrication times, among other benefits, as compared to other accelerometers, systems, and methods. An "accelerometer" as used herein can be referred to as an apparatus. As used herein, it is noted that the term "apparatus" is intended to be inclusive of optical components, optical cables, sensor stations, housings, and/or devices that can be assembled to form a system. The term "system" as used herein is intended to mean one or more components coupled together to achieve a particular function, such as determining acceleration.

As mentioned, optical apparatuses can be utilized to sense acceleration, motion and/or pressure, among others. For instance, optical apparatuses, such as the accelerometers disclosed herein, can be deployed on the seafloor for reservoir monitoring and/or geophysical surveying. For some applications, the accelerometers disclosed herein can be referred to as marine accelerometers. The accelerometers disclosed herein can be utilized for various applications, including non-marine applications. Reservoir monitoring can include monitoring of substances, such as hydrocarbons, in subsurface formations, such as oil and/or gas, flows, as well as injection processes, for example.

"Seafloor", as used herein, refers to the floor of a body of water, such as an ocean, a sea, or a lake, for example. The body of water can be a salt-water body of water, a fresh-water body of water, or a brackish body of water.

Previous accelerometers, which were deployed on the seafloor, have typically been formed by winding multiple layers of optical fiber onto a collapsible bobbin. The winding was then removed from the collapsible bobbin and thereafter manually saturated with an adhesive to bond the winding onto a portion of the accelerometer. However, in utilizing this process, air bubbles can be trapped within the winding. Because the previous accelerometers were deployed on the seafloor, they were subjected to hydrostatic pressures that were sufficient to cause these trapped air bubbles to collapse. The collapsing of air bubbles can result in micro-bending of nearby windings of the optical fiber. Micro-bending can cause undesirable attenuation of light and/or reduce the mechanical reliability of the optical fiber, resulting in shorted life span, for instance.

The accelerometers disclosed herein can be utilized on the seafloor for reservoir monitoring and/or geophysical surveying at various depths. For example, for some applications the accelerometers can be deployed at depths of 1,600 meters, or more. As such, the accelerometers can be subjected to a hydrostatic pressure of 16,185 kilopascals or more. Advantageously, the accelerometers disclosed herein can help provide reduced micro-bending, as compared to other accelerometers. For instance, and as discussed further herein, coils of optical fibers can be encapsulated in a cured encapsulation composition to reduce formation of air bubbles within the coils of optical fibers, as compared to previous accelerometers. Further, while providing reduced micro-bending, embodiments of the accelerometers disclosed herein can be produced at a reduced cost and/or fabrication time, as compared to other accelerometers. For instance as discussed further herein, embodiments of the accelerometers can allow for better tolerance to a disorganized coil of optical fiber, as compared to other accelerometers. As used herein a "disorganized coil of optical fiber" refers to a coil of optical fiber having cross-hosing. "Cross-hosing" refers to an optical fiber of a particular layer of a coil crossing over an optical fiber of an adjacent layer of the coil. Cross-hosing can create a space, such as a space between individual windings of the optical fiber. As described above, such spaces may collapse at marine depths.

It is to be understood the present disclosure is not limited to particular devices or methods, which can, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "may" and "can" are used throughout this application in a permissive sense, i.e., having the potential to, being able to, not in a mandatory sense, i.e., must. The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an example of a portion of a system 102. The system 102 includes a flexural beam 104. As used herein, "flexural beam" refers to a flexible substrate to which a number of coils of optical fiber can be attached.

The flexural beam 104 can be formed from a variety of materials, such as materials that can exhibit elastic strain. In at least one embodiment the flexural beam 104 can be formed from plastic.

The flexural beam 104 can have a length 106, which corresponds to a longitudinal dimension of the flexural beam 104. In at least one embodiment, the length 106 can be from about 3.0 to about 15.0 centimeters. All individual values and subranges from 3.0 to 15.0 centimeters are included; for example, length 106 can be from a lower limit of 3.0, 3.5, or 4.0 centimeters to an upper limit of 15.0, 12.0, or 10.0 centimeters.

The flexural beam 104 can have a thickness 108, which corresponds to a dimension that is perpendicular to the longitudinal dimension. In at least one embodiment, the thickness 108 can be from about 0.3 millimeters to about 2.0 centimeters. All individual values and subranges from 0.3 millimeters to 2.0 centimeters are included; for example, thickness 108 can be from a lower limit of 0.3, 0.4, or 0.5 millimeters to an upper limit of 2.0, 1.9, or 1.8 centimeters.

The flexural beam 104 can have a width 110, which corresponds to a dimension that is perpendicular to both the longitudinal dimension and the thickness. In at least one embodiment, the width 110 can be from about 1.5 to about 3.5 centimeters. All individual values and subranges from 1.5 to 3.5 centimeters are included; for example, width 110 can be from a lower limit of 1.5, 1.7, or 1.9 centimeters to an upper limit of 3.5, 3.3, or 3.1 centimeters.

The flexural beam 104 includes a first face 112 and a second face opposite the first face 112. As used herein the terms "first" and "second" are used as terms of differentiation, and imply neither a particular order nor degree of importance. As used herein the terms "face" refers to a surface. In at least one embodiment, a portion of the surface or an entirety thereof can be planar. However, examples of the present disclosure are not so limited. The first face 112 can be located in first plane having a first outward point 114 of thickness 108, while the second face is located in a second plane, which is parallel to the first plane and includes a second outward point 116 of thickness 108.

The flexural beam 104 includes a first hub 118 and a second hub 120. As illustrated in FIG. 1, the first hub 118 and the second hub 120 each extend away from the first plane of the first face 112. The first hub 118 and the second hub 120 can each extend away from the first face 112 in a direction that is substantially parallel to the thickness 108. As used herein, "substantially parallel" is intended to mean more parallel than perpendicular.

The flexural beam 104 includes a third hub 122 and a fourth hub 124. The third hub 122 and the fourth hub 124 each extend away from the second face. The third hub 122 and the fourth hub 124 can each extend away from the second plane of the second face in a direction that is substantially parallel to the thickness 108, and opposite the direction that the first hub 118 and the second hub 120 extend away from the first face 112.

The hubs 118, 120, 122, 124 can each include a variety of shapes including, but not limited to, a circle, an oval, a square, a triangle, a trapezoid, a polygon, portions thereof, and combinations thereof. Persons of ordinary skill in the art can identify various shapes of the hubs 118, 120, 122, 124. In at least one embodiment, each of the hubs 118, 120, 122, 124 includes a respective partial circle. For instance, first hub 118 can include a partial circle having a radius 126 extending from line 128, which is parallel to the width 110.

The hubs 118, 120 are coupled to the first face 112, and the hubs 122, 124 are coupled to the second face. In at least one embodiment, the hubs 118, 120, 122, 124 can be integrally formed. For instance, the hubs 118, 120, 122, 124 and the flexural beam 104 can be a unitary material, e.g., the hubs 118, 120, 122, 124 and the flexural beam 104 can be formed from an injection molding process. However, examples of the present disclosure are not so limited. In another embodiment, the hubs 118, 120, 122, 124 can be respectively coupled to the first face 112 and to the second face by mechanical adhesion, such as by screws, among others, and/or by chemical adhesion, such by glue. While hubs 118, 120 and hubs 122, 124 are respectively illustrated as discrete components, embodiments are not so limited. In at least one embodiment, first hub 118 and second hub 120 may be singular. For instance, first hub 118 and second hub 120 can be combined to form a unitary structure. In at least one embodiment, third hub 122 and fourth hub 124 can be singular.

As shown in FIG. 1, a first coil of optical fiber 130 can be coupled to the flexural beam 104, For instance, as shown in FIG. 1, the first coil of optical fiber 130 can be coupled to the first face 112. In at least one embodiment, the first coil of optical fiber 130 may encompass the first hub 118 and the second hub 120 on the first face 112 of the flexural beam 104. As used herein, "encompass" is intended to mean at least partially surround in one or more dimensions. For instance, the first coil of optical fiber 130 can be wound about the first hub 118 and the second hub 120. In other words, the first coil of optical fiber 130 can be attached to the first hub 118 and the second hub 120 on the first face 112 of the flexural beam 104. In previous accelerometers, a coil of optical fiber on a flexural beam of an accelerometer was wound onto a collapsible bobbin, removed from the collapsible bobbin, and then transferred to the flexural beam. In contrast, for embodiments of the present disclosure the optical fiber can be wound directly to a portion of the flexural beam 104, such as the first hub 118 and the second hub 120. Because the optical fiber can be wound directly to the flexural beam 104, production times of the accelerometers disclosed herein can be advantageously reduced, as compared to previous accelerometers. In at least one embodiment, the optical fiber is buffered optical fiber.

The first coil of optical fiber 130 can include from about 4 meters to about 25 meters of optical fiber, for example. The first coil of optical fiber 130 can include a number of windings of optical fiber around the first hub 118 and the second hub 120. All individual values and subranges from 4 meters to 25 meters are included; for example, the first coil of optical fiber 130 can include from a lower limit of 4, 5, or 6 meters of optical fiber to an upper limit of 25, 23, or 20 meters of optical fiber. For some applications, such as a number of non-marine applications, first coil of optical fiber 130 can include other lengths of optical fiber.

The first coil of optical fiber 130 can have various shapes, as the first coil of optical fiber 130 is formed about the first hub 118 and the second hub 120, which as discussed herein can include various shapes. For some embodiments, the first coil of optical fiber 130 can be an oval shape. For some applications, utilizing an oval shape can help to provide an increased amount of optical fiber disposed along a direction parallel the length 106, relative to a decreased amount of optical fiber disposed along a direction parallel with the width 110. Such an oval shape can help reduce bending within the optical fiber to help reduce associated optical losses.

The first coil of optical fiber 130 can be formed by utilizing an optical fiber winder, which may also be referred to as a spooler. Optical fiber winders are commercially available. Because an optical fiber winder can be utilized to wind the first coil of optical fiber 130 around the first hub 118 and the second hub 120, in contrast to previous accelerometers that were made by manually transferring the winding to a portion of the accelerometer, production times of the accelerometers disclosed herein can be advantageously reduced, as compared to the previous accelerometers.

In at least one embodiment the first coil of optical fiber 130 is separated from the first face 112. For instance, the first hub 118 and the second hub 120 may suspend the first coil of optical fiber 130 apart from the first face 112. However, embodiments of the present disclosure are not so limited. In at least one embodiment the first coil of optical fiber 130 contacts the first face 112.

The flexural beam 104 includes a second coil of optical fiber encompassing the third hub 122 and the fourth hub 124. The second coil of optical fiber can be analogous to the first coil of optical fiber 130, although as mentioned the second coil encompasses the third hub 122 and the fourth hub 124.

The second coil of optical fiber can include from about 4 meters to about 25 meters of optical fiber. All individual values and subranges from 4 meters to 25 meters are included; for example, the second coil of optical fiber can include from a lower limit of 4, 5, or 6 meters of optical fiber to an upper limit of 25, 23, or 20 meters of optical fiber. For some applications, such as a number of non-marine applications, second coil of optical fiber can include other lengths of optical fiber.

In at least one embodiment the first coil of optical fiber 130 includes a greater length of optical fiber than the second coil of optical fiber. In at least one embodiment, the second coil of optical fiber includes a greater length of optical fiber than the first coil of optical fiber 130. Each of the first coil of optical fiber 130 and the second coil of optical fiber can be considered to form a respective path of a Michelson interferometer. Because the first coil of optical fiber 130 and the second coil of optical fiber have different lengths, a "time of flight" for each of the coils is different. For example, incident light can be split, e.g., equally, into the two paths of the interferometer. The split light can reflect back from reflectively terminated ends of each of the first coil of optical fiber 130 and the second coil of optical fiber to arrive back at the split point at different times. As such, an interference pattern can be produced, for instance, at the interferometer's output. The interference pattern is related to a difference in lengths between the first coil of optical fiber 130 and the second coil of optical fiber.

The first coil of optical fiber 130 and the second coil of optical fiber can be encapsulated by a cured encapsulation composition 132 (illustrated as a rectangular solid), where the encapsulation composition has a viscosity from about 30 to about 300 millipascal-second at 25° C., for example. All individual values and subranges from 30 to about 300 millipascal-second at 25° are included; for example, the encapsulation composition can have a viscosity from a lower limit of 50, 40, or 30 millipascal-second at 25° C. to an upper limit of 300, 275, or 250 millipascal-second at 25° C. In at least one embodiment, an encapsulation composition having a viscosity less than or equal to 7000 millipascal-second at 25° C. may be utilized. As used herein "viscosity" is a measure of a fluids resistance to deformation by stress. As used herein "encapsulated" refers to covering of at least ninety percent of a surface area. For instance, when the cured encapsulation composition 132 covers ninety-five percent or more of a surface area of the first coil of optical fiber 130, the first coil of optical fiber 130 is encapsulated. The encapsulation composition may be referred to as a low viscosity encapsulation composition. As would be understood by one of ordinary skill in the art with the benefit of this disclosure, viscosity of the encapsulation composition can be determined according to ASTM D445. Utilizing the encapsulation composition, as disclosed herein, can help to facilitate filling spaces, such as spaces created by crosshosing, between individual windings of the optical fiber.

The encapsulation composition can be selected from a variety of compositions including epoxy resins, polyurethanes, and photo polymers, for example. Epoxy resins include, but are not limited to, an aromatic epoxy resin, an alicyclic epoxy resin, an aliphatic epoxy resin, or a combination thereof. In at least one embodiment, the encapsulation composition is a liquid at a temperature from at least about 5° C. to about 40° C. Utilizing the encapsulation composition as a liquid can help facilitate injection of the encapsulation composition, as discussed further herein.

Examples of aromatic epoxy compounds include, but are not limited to, glycidyl ether compounds of polyphenols, such as hydroquinone, resorcinol, bisphenol A, bisphenol F, 4,4'-dihydroxybiphenyl, phenol novolac, cresol novolac, trisphenol (tris-(4-hydroxyphenyl)methane), 1,1,2,2-tetra(4-hydroxyphenyl)ethane, tetrabromobisphenol A, 2,2-bis(4-hydroxyphenyl)-1,1,1,3,3,3-hexafluoropropane, 1,6-dihydroxynaphthalene, and combinations thereof.

Examples of alicyclic epoxy compounds include, but are not limited to, polyglycidyl ethers of polyols having at least one alicyclic ring, or compounds including cyclohexene oxide or cyclopentene oxide obtained by epoxidizing compounds including a cyclohexene ring or cyclopentene ring with an oxidizer.

Examples of aliphatic epoxy compounds include, but are not limited to, polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers.

Persons of ordinary skill in the art can identify various photo polymers that can be utilized.

The encapsulation composition can include a curing agent. The curing agent can be selected from the group consisting of novolacs, amines, anhydrides, carboxylic acids, phenols, thiols, and combinations thereof. For example, the curing agent can be from about 1 weight percent to about 50 weight percent of the encapsulation composition. All individual values and subranges from 1 weight percent to 50 weight percent of the encapsulation composition are included; for example, the curing agent can be from a lower limit of 1, 5, or 19 weight percent to an upper limit of 50, 45, or 40 weight percent of the encapsulation composition. In at least one embodiment, a combination of the epoxy resin and the curing agent sums to 100 weight percent of the epoxy resin composition.

In at least one embodiment, the encapsulation composition can include one or more additives. Examples of additives include, but are not limited to, fillers, pigments, dyes, stabilizer, flow-control agents, accelerators, modifiers, and combinations thereof. Different amounts of the additive can be utilized for various applications.

The first coil of optical fiber 130 and the second coil of optical fiber can be encapsulated by a cured encapsulation composition 132 by a vacuum encapsulation process. For instance, the flexural beam 104, having the first coil of optical fiber 130 and the second coil of optical fiber attached thereto, can be placed into a chamber to which a vacuum, e.g. a reduced atmospheric pressure, can be applied. The encapsulation composition can be injected into the chamber to encapsulate the first coil of optical fiber and the second coil of optical fiber. As the encapsulation composition is injected into the chamber, components of the encapsulation composition can chemically react with each other to form the cured encapsulation composition 132. This chemical reaction, which may be referred to as curing, can crosslink components of the encapsulation composition to provide the cured encapsulation composition 132. The cured encapsulation composition 132 may be a relatively high molecular weight material, as compared to components of the encapsulation composition.

The vacuum, e.g. the reduced atmospheric pressure, can be from about 350 to about 850 millibars. All individual values and subranges from 350 to 850 millibars are included; for example, the reduced atmospheric pressure can be from a lower limit of 350, 375, or 400 millibars to an upper limit of 850, 800, or 750 millibars. The vacuum can help to facilitate filling spaces, such as spaces created by cross-hosing, between individual windings of the optical fiber because the vacuum can help the encapsulation composition flow into spaces that may have formed.

The vacuum encapsulation process can be performed at a temperature from about 15° C. to about 60° C. Performing the vacuum encapsulation process at this temperature can help provide improved encapsulation and/or promote curing of the encapsulation composition. All individual values and subranges from 15° C. to 60° C. are included; for example, the vacuum encapsulation process can be performed at a temperature from a lower limit of 15, 18, or 20° C. to an upper limit of 60, 55, or 50° C.

While curing of the encapsulation composition at the reduced atmospheric pressure may be complete curing, embodiments of the present disclosure are not so limited. For instance in at least one embodiment, prior to complete curing of the encapsulation composition, the flexural beam 104 having the partially cured encapsulation composition thereon can be removed from the reduced atmospheric pressure environment for further curing. The flexural beam 104 having the partially cured encapsulation composition thereon can be placed in an increased pressure environment, such as an increased atmospheric pressure environment, for further curing. As used herein "partially cured" refers to an intermediate state of curing, where the partially cured encapsulation composition has an intermediate molecular weight material, as compared to components of the encapsulation composition and the cured encapsulation composition. For some applications, utilizing the increased pressure environment can help decrease spaces between individual windings of the optical fiber. This further curing can be performed at a temperature of about 10° C. to about 200° C. and at pressure of about 100 kilopascals to about 1000 kilopascals, for example.

Because at least one embodiment of the present disclosure utilizes the encapsulation composition having a viscosity from about 30 to about 300 millipascal-second at 25° C. and the vacuum encapsulation process, the cured encapsulation composition 132 can have a reduced content of air bubbles, as compared to previous accelerometers, even when the first coil of optical fiber 130 and/or the second coil of optical fiber include cross-hosing. The reduced content of air bubbles can help reduce micro-bending and corresponding undesirable attenuation of light and/or reduction of mechanical reliability of the optical fiber. In at least one embodiment, the encapsulated first coil of optical fiber 130 and/or the encapsulated second coil of optical fiber can be substantially void free. As used herein, "substantially void free" is intended to mean that an encapsulated coil of optical fiber has a void fraction of less than ten percent. For instance, ninety percent or more of the volume of the encapsulated coil of fiber is occupied by optical fiber or cured encapsulation composition. In other words, the encapsulation of the first coil of optical fiber 130 and/or the second coil of optical fiber by the cured encapsulation composition 132 can be referred to as a complete encapsulation.

As mentioned, the cured encapsulation composition 132 can encapsulate the first coil of optical fiber 130 and the second coil of optical fiber. In at least one embodiment, the cured encapsulation composition 132 can encapsulate other components. For instance, the cured encapsulation composition 132 can encapsulate a portion, including the entirety, of the flexural beam 104, the first face 112 of the flexural beam 104, the second face of the flexural beam 104, the first hub 118, the second hub 120, third hub 122, and/or the fourth hub 124.

The cured encapsulation composition 132 can have a regular shape, an irregular shape, or a combination thereof. For instance, the cured encapsulation composition 132 can have cross-sections of various shapes including, but not limited to, a circle, an oval, a square, a triangle, a trapezoid, portions thereof, and combinations thereof.

The cured encapsulation composition 132 can have an average length 134 from about 3.0 to about 15.0 centimeters, for example. All individual values and subranges from 3.0 to 15.0 centimeters are included; for example, average length 134 can be from a lower limit of 3.0, 3.5, or 4.0 centimeters to an upper limit of 15.0, 12.0, or 10.0 centimeters.

The cured encapsulation composition 132 can have an average thickness 136 from about 0.3 to about 2.0 centimeters, for example. All individual values and subranges from 0.3 to 2.0 centimeters are included; for example, the average thickness 136 can be from a lower limit of 0.3, 0.4, or 0.5 centimeters to an upper limit of 2.0, 1.9, or 1.8 centimeters.

The cured encapsulation composition 132 can have an average width 138 from about 1.5 to about 3.5 centimeters, for example. All individual values and subranges from 1.5 to 3.5 centimeters are included; for example, the average width 138 can be from a lower limit of 1.5, 1.7, or 1.9 centimeters to an upper limit of 3.5, 3.3, or 3.1 centimeters.

In at least one embodiment the flexural beam 104 includes one or more channels 131-1, 131-2, 131-3, 131-4. While FIG. 1 illustrates four channels 131-1, 131-2, 131-3, 131-4, embodiments of the present disclosure are not so limited. For instance, in at least one embodiment more than four channels can be utilized; and in at least one alternate embodiment fewer than four channels can be utilized.

The channels 131-1, 131-2, 131-3, 131-4 can be configured to provide fluid communication between the first face 112 and the second face prior to the encapsulation. For example, the channels 131-1, 131-2, 131-3, 131-4 can be configured so the encapsulation composition is able to flow through the channels 131-1, 131-2, 131-3, 131-4, e.g. the encapsulation composition can flow from the second face to contact the first coil of optical fiber 130 and the encapsulation composition can flow from the first face 112 to contact the second coil of optical fiber. For instance, in at least one embodiment, injecting the encapsulation composition, as discussed further herein, can cause the encapsulation composition to flow through one or more of the channels 131-1, 131-2, 131-3, 131-4 from the first face to the second face, for example. The channels 131-1, 131-2, 131-3, 131-4 can help to provide that portions of the cured encapsulation composition 132 on opposite sides of the flexural beam 104 are connected to one another by a network of the cured encapsulation composition 132. Providing that portions of the cured encapsulation composition 132 on opposite sides of the flexural beam 104 are connected to one another can help provide improved mechanical properties, as compared to previous accelerometers.

In at least one embodiment, the flexural beam 104 includes one or more mass mount apertures 140-1, 140-2, 140-3. While FIG. 1 illustrates three mass mount apertures 140-1, 140-2, 140-3, embodiments of the present disclosure are not so limited. For instance, in at least one embodiment more than three mass mount apertures can be utilized, and in at least one alternate embodiment fewer than three mass mount apertures can be utilized. In at least one embodiment, prior to encapsulation of the first coil of optical fiber 130 and the second coil of optical fiber with the cured encapsulation composition 132, the mass mount apertures 140-1, 140-2, 140-3 are reversibly plugged to prevent the cured encapsulation composition 132 from forming in the mass mount apertures 140-1, 140-2, 140-3. For instance, a respective removable peg may be inserted into each of the mass mount apertures 140-1, 140-2, 140-3 for the encapsulation, and thereafter the respective removable pegs may be removed. The mass mount apertures 140-1, 140-2, 140-3 can be utilized for mounting a mass to the flexural beam 104, as discussed further herein.

In at least one embodiment the flexural beam 104 includes one or more housing mount apertures 142-1, 142-2, 142-3, 142-4. While FIG. 1 illustrates four housing mount apertures 142-1, 142-2, 142-3, 142-4 embodiments of the present disclosure are not so limited. For instance, in at least one embodiment more than four housing mount apertures can be utilized; and in at least one alternate embodiment fewer than four housing mount apertures can be utilized. In at least one embodiment, prior to encapsulation of the first coil of optical fiber 130 and the second coil of optical fiber with the cured encapsulation composition 132, the housing mount apertures 142-1, 142-2, 142-3, 142-4 are reversibly plugged to prevent the cured encapsulation composition 132 from forming in the housing mount apertures 142-1, 142-2, 142-3, 142-4. For instance, a respective removable peg may be inserted into each of the housing mount apertures 142-1, 142-2, 142-3, 142-4 for the encapsulation, and thereafter the respective removable pegs may be removed. The housing mount apertures 142-1, 142-2, 142-3, 142-4 can be utilized for mounting the system 102 to a housing, as discussed further herein.

Figure 2:
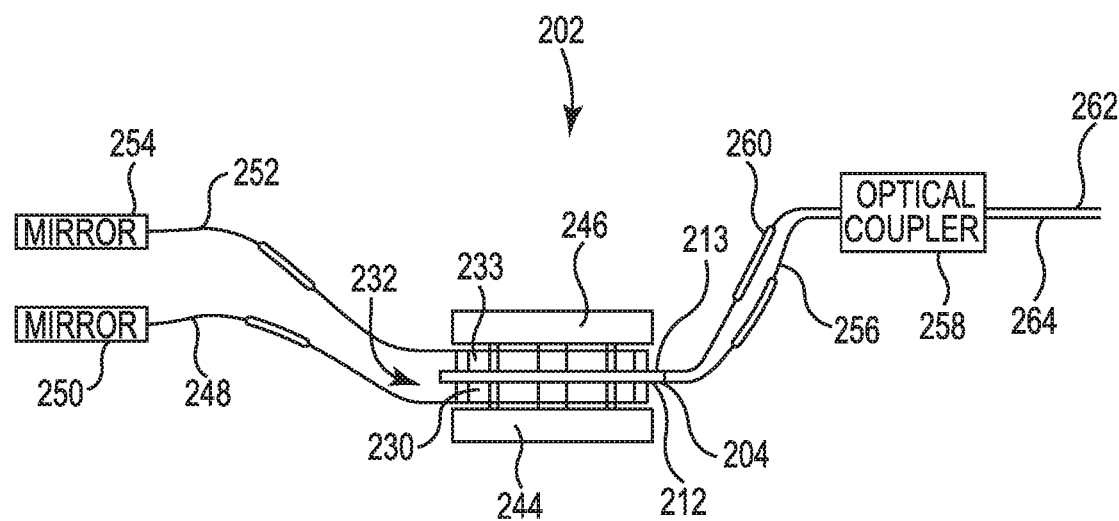
FIG. 2 illustrates an example of a portion of a system.

FIG. 2 illustrates an example of a portion of a system 202. FIG. 2 illustrates a top view of the portion of the system 202. As discussed herein, the system 202 can include a flexural beam 204 having a first face 212 and a second face 213, a first coil of optical fiber 230 and a second coil of optical fiber 233, and a cured encapsulation composition 232 that can encapsulate the first coil of optical fiber 230 and the second coil of optical fiber 233.

As illustrated in FIG. 2, a first mass 244 and a second mass 246 can be coupled to the flexural beam 204. For instance, the first mass 244 can be mounted to the first face 212 and the second mass 246 can be mounted to the second face 213. As an example, the first mass 244 and the second mass 246 can be coupled to the flexural beam 204 by mechanical adhesion, such as by screws engaging the mass mount apertures discussed herein, among others. The first mass 244 and the second mass 246 can be utilized to increase an amount of deflection of the flexural beam 204 under a given amount of acceleration, and thus, increase overall sensitivity.

The first mass 244 and the second mass 246 can each have a mass from about 5 to about 500 grams. All individual values and subranges from 5 to 500 grams are included; for example, the first mass 244 and the second mass 246 can each have a mass from a lower limit of 5, 10, or 15 grams to an upper limit of 500, 450, or 400 grams.

The first mass 244 and the second mass 246 can be formed from various materials. As would be understood by one of ordinary skill in the art with the benefit of this disclosure, suitable materials would be sufficiently durable and dense to be utilized to increase an amount of deflection of the flexural beam 204 under a given amount of acceleration. In at least one embodiment the first mass 244 and the second mass 246 can be formed from a metal. An example of the metal is brass, among others.

As illustrated in FIG. 2, a first end portion 248 of the first coil of optical fiber 230 is coupled, e.g. optically coupled, for example, fusion spliced, to a first mirror 250. Similarly, a first end portion 252 of the second coil of optical fiber 233 is coupled to a second mirror 254. In at least one embodiment, the first mirror 250 and the second mirror 254 are Faraday Rotating Mirrors.

A second end portion 256 of the first coil of optical fiber 230 is coupled to an optical coupler 258. Similarly, a second end portion 260 of the second coil of optical fiber 233 is coupled to the optical coupler 258.

In operation, inertia of the accelerometer can cause the flexural beam 204 to flex. When present, inertia of the first mass 244 and the second mass 246 can cause the flexural beam 204 to flex. In flexure, the first coil of optical fiber 230 and the second coil of optical fiber 233 may experience opposite stresses of approximately equal magnitude, and as such, the first coil of optical fiber 230 and the second coil of optical fiber 233 may grow and shrink in complementarity fashion, as in a "push-pull" fashion. For instance, if the accelerometer is accelerated in a direction that is perpendicular to a plane of the flexural beam 204, the flexural beam 204 may flex due to inertia. When the flexural beam 204 flexes in particular direction, such as a downward direction, the coil of optical fiber on the top side of the flexural beam 204 may be subject to a compressive stress that can cause a decrease of its length. Simultaneously, the coil of optical fiber on the bottom side of the flexural beam 204 may be subject to a tensile stress that can cause an increase of its length. The decrease and the increase can be considered equal in magnitude, but opposite in phase. As such, the difference between the lengths of the coils of optical fiber may change in response to excitation, and a representative change in an interferometer's interference pattern output can be observed. If the accelerometer is accelerated in a direction that is parallel to a plane of the flexural beam 204, of the coils of optical fiber may each be subject to both compression and tension in equal parts. Therefore, assuming perfect symmetry of the flexural beam 204, the net strain within each coil of optical fiber, as well as the change in length, will be zero. As neither coil of optical fiber changes length, there will be no change in the difference between their lengths and correspondingly no observable sensitivity to the acceleration. For instances of partial rotation about an axis of the flexural beam 204, the partial rotation may result in strains in each of the coils of optical fiber. However, at least one degree of symmetry will result in no change in the difference between the lengths of the coils of optical fiber.

The optical coupler 258 can include an input leg 262 to receive light. For instance, coherent light of an appropriate wavelength can be projected into the input leg 262 of the optical coupler 258. The input light may split and travel through each of the first coil of optical fiber 230 and the second coil of optical fiber 233 towards each of the first mirror 250 and second mirror 254 and then reflect back to the optical coupler 258. Upon reaching the optical coupler 258, the light may combine and interfere. Because the lengths of the first coil of optical fiber 230 and the second coil of optical fiber 233 are different, the time of flight of light in each coil will be different. An interference pattern, which can be generated as the reflected light interferes at the optical coupler 258, is thought to be a function of the difference in length of the first coil of optical fiber 230 and the second coil of optical fiber 233. The interference pattern tends to be directly proportional to acceleration. Interfered light may be observable via an output leg 264 of the optical coupler 258. Consequently, system 202 may be referred to as an accelerometer.

Figure 3:
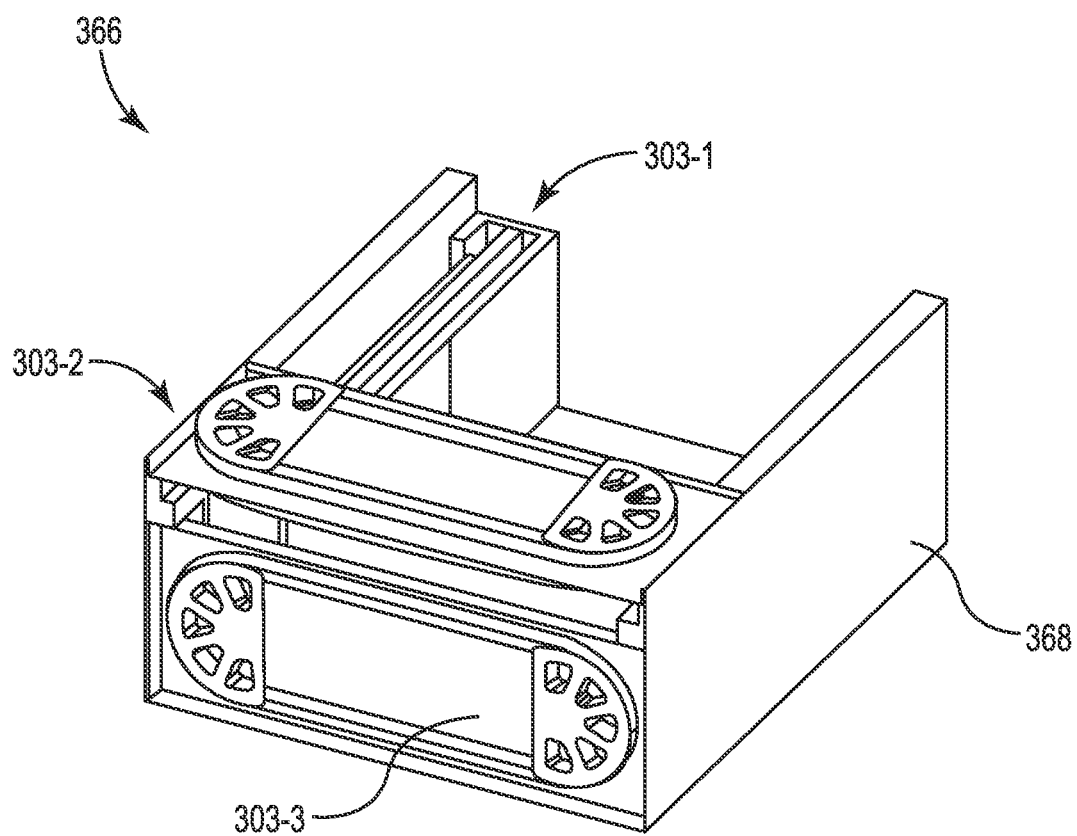
FIG. 3 illustrates an example of a portion of a system.

FIG. 3 illustrates an example of a portion of a system 366. As illustrated in FIG. 3, the system 366 can include a number of accelerometers 303-1, 303-2, 303-3. While FIG. 3 illustrates three accelerometers, embodiments of the present disclosure are not so limited.

As illustrated in FIG. 3, in at least one embodiment the accelerometers 303-1, 303-2, 303-3 are arranged such that each accelerometer is mutually substantially orthogonal from the other two accelerometers. For instance, respective flexural beams of each of the accelerometers 303-1, 303-2, 303-3 may be arranged such that a longitudinal dimension of respective flexural beams are substantially orthogonal relative to each other. As such, the system 366 can function as a three-dimensional accelerometer. Arranging the accelerometers 303-1, 303-2, 303-3 to be mutually substantially orthogonal can facilitate determining a direction from which a detected seismic energy originates, for instance. However, other arrangements of the accelerometers 303-1, 303-2, 303-3 can be used for various embodiments, while maintaining a capability of determining direction of origin of seismic energy. As used herein, "substantially orthogonal" is intended to mean less than ten degrees away from orthogonal.

The system 366 can include a housing 368, a portion of which is illustrated in FIG. 3. The housing 368 can house the accelerometers 303-1, 303-2, 303-3. The accelerometers 303-1, 303-2, 303-3 can be secured to the housing 368, for example by utilizing screws and the housing mount apertures discussed herein.

In at least one embodiment, the housing 368 can include a lid. The lid can be utilized to seal the seal the housing 368, e.g., to seal the accelerometers 303-1, 303-2, 303-3 within the housing 368.

In at least one embodiment, a portion of the system 366 can be pressure balanced. As used herein, the term "pressure balanced" is intended to mean that a substantially similar amount of pressure is provided outward from an interior of the system toward an exterior as an amount of pressure that exists inward from an exterior of the system toward an interior. In some embodiments, the sealed housing can be filled with a fluid, such as oil, among others, to achieve pressure balancing. Pressure balancing can help reduce compressibility of the system 366, thereby increasing durability and/or reliability.

Figure 4:
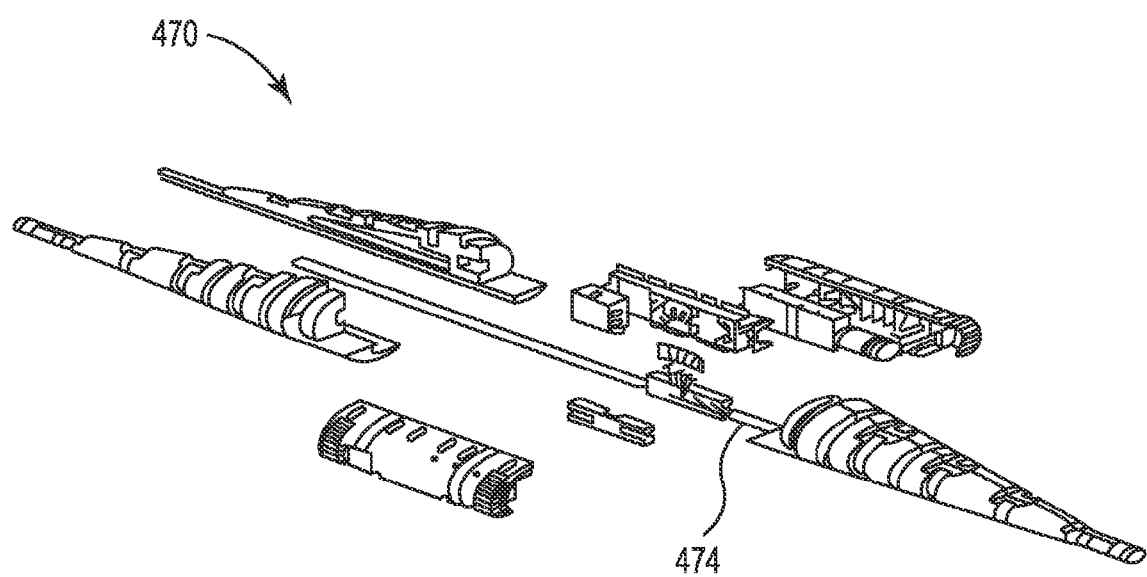
FIG. 4 is an exploded view of an example of a portion of a system.

FIG. 4 is an exploded view of an example of a portion of a system 470. The system 470 can be deployed on a seafloor for reservoir monitoring and/or geophysical surveying. The system 470 can include can include the accelerometers 202, 303, 366 disclosed herein. The system 470 can include a number of other components, such as hydrophone, among others.

The system 470 can be coupled to a number of other systems, such as sensor stations, by cable 474 to form an array. As an example, an array can include twenty-eight sensor stations each having approximately one hundred meters of cable between one another. Advantageously, in at least one embodiment, the accelerometers disclosed herein are passive, e.g. fully passive. As such, the accelerometers can operate with no in-sea electricity. Additionally, in at least one embodiment, other components of the system 470 can operate with no in-sea electricity. Therefore, no in-sea electricity is utilized to operate the system 470.

Figure 5:
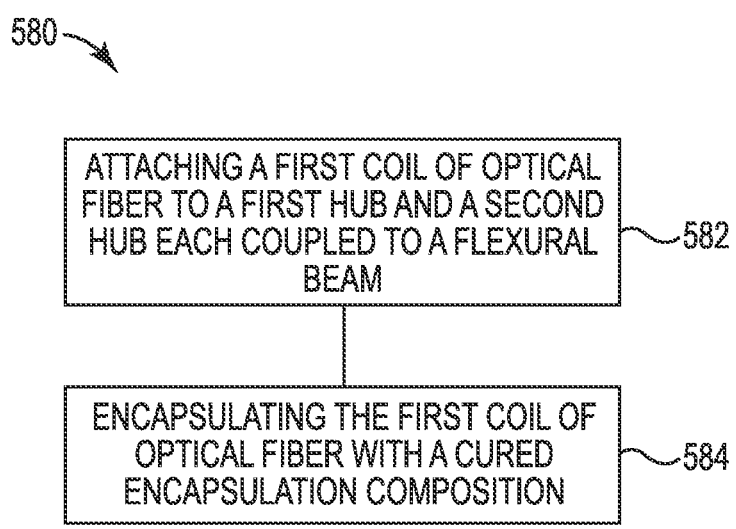
FIG. 5 illustrates an example method flow diagram for forming an accelerometer or parts thereof.

FIG. 5 illustrates a method flow diagram 580 for forming an accelerometer. As mentioned, the disclosed apparatuses, systems, and methods for accelerometers can help reduce costs and/or fabrication times, among other benefits, as compared to other accelerometers, systems, and methods.

At 582, the method can include attaching a first coil of optical fiber to a first hub and a second hub each coupled to a flexural beam. As previously discussed, the first coil of optical fiber may encompass the first hub and the second hub. At 584, the method can include encapsulating the first coil of optical fiber with a cured encapsulation composition, as discussed herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein, either explicitly or implicitly, or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. The method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. An apparatus, comprising:
   a flexural beam having a first face and a second face opposite the first face; and
   a first coil of optical fiber coupled to the first face, wherein the first coil of optical fiber is encapsulated by a cured encapsulation composition that fills space between individual windings of the optical fiber, wherein the encapsulation composition has a viscosity from 30 to 300 millipascal-second at 25° C.

2. The apparatus of claim 1, further comprising a first hub and a second hub extending from and coupled to the first face, wherein the first coil of optical fiber encompasses the first hub and the second hub.

3. The apparatus of claim 1, wherein the flexural beam comprises a channel configured to provide fluid communication between the first face and the second face prior to the encapsulation.

4. The apparatus of claim 2, further comprising:
   a third hub and a fourth hub extending from and coupled to the second face; and
   a second coil of optical fiber encompassing the third hub and the fourth hub.

5. The apparatus of claim 4, wherein the second coil of optical fiber is encapsulated by the cured encapsulation composition.

6. The apparatus of claim 5, wherein the first coil of optical fiber comprises a length of optical fiber greater than a length of optical fiber of the second coil of optical fiber.

7. The apparatus of claim 6, wherein the length of the first coil of optical fiber is between 4 meters and 25 meters of optical fiber.

8. The apparatus of claim 5, further comprising a first mass and a second mass coupled to the flexural beam, wherein the first mass and the second mass each have a mass between 5 grams and 500 grams.

9. The apparatus of claim 1, further comprising a second flexural beam having a coil of optical fiber coupled thereto and a third flexural beam having a coil of optical fiber coupled thereto, wherein each of the respective coils of optical fiber are encapsulated by a cured encapsulation composition, wherein the encapsulation composition has a viscosity from 30 to 300 millipascal-second at 25° C., and wherein a longitudinal dimension of each of the respective flexural beams are substantially orthogonal relative to each other.

10. An apparatus, comprising:
    a flexural beam having a first face and a second face opposite the first face;
    a first hub and a second hub extending from and coupled to the first face; and
    a first coil of optical fiber encompassing the first hub and the second hub, wherein the first coil of optical fiber has cross-hosing that creates a space between individual windings of the optical fiber, and wherein the first coil is encapsulated by a cured encapsulation composition that fills the space between individual windings of the optical fiber to yield a substantially void free encapsulated first coil.

11. The apparatus of claim 10, further comprising:
    a third hub and a fourth hub extending from and coupled to the second face; and
    a second coil of optical fiber encompassing the third hub and the fourth hub, wherein the second coil of optical fiber is encapsulated by the cured encapsulation composition to yield a substantially void free encapsulated second coil.

12. The apparatus of claim 11, further comprising:
    a first mirror, wherein a first end portion of the first coil of optical fiber is coupled to the first mirror; and
    a second mirror, wherein a first end portion of the second coil of optical fiber is coupled to the second mirror.

13. The apparatus of claim 12, further comprising an optical coupler, wherein a second end portion of the first coil of optical fiber and a second end portion of the second coil of optical fiber are coupled to the optical coupler.

14. The apparatus of claim 13, wherein the optical coupler comprises an input leg to receive light.

15. The apparatus of claim 14, wherein the optical coupler comprises an output leg to observe a generated interference pattern.

16. A method of forming an accelerometer comprising:
    attaching a first coil of optical fiber to a first hub and a second hub each coupled to a flexural beam such that a space exists between individual windings of the optical fiber;
    encapsulating the first coil of optical fiber with an encapsulation composition, wherein encapsulating the first coil includes:
      applying a vacuum to a chamber housing the flexural beam; and
      injecting an encapsulation composition having a viscosity from 30 to 300 millipascal-second at 25° C. into the chamber; and
    curing the encapsulation composition thereby filling the space between individual windings of the optical fiber.

17. The method of claim 16, wherein the flexural beam has a first face and a second face opposite the first face, and a channel configured to provide fluid communication between the first face and the second face, and the injecting comprises causes the encapsulation composition to flow through the channel from the first face to the second face.

18. The method of claim 17, further comprising, forming a second coil of optical fiber attached to a third hub and a fourth hub each coupled to the flexural beam, wherein the encapsulating the first coil of optical fiber also encapsulates the second coil of optical fiber.

19. The method of claim 16, wherein curing the encapsulation composition comprises:
    partially curing the encapsulation composition in the chamber while the vacuum is applied thereto; and
    further curing the partially cured encapsulation composition in an increased pressure environment.

20. The method of claim 16, wherein curing the encapsulation composition comprises curing the encapsulation composition in the chamber while the vacuum is applied thereto.

21. The method of claim 16, wherein attaching the first coil of optical fiber to the first hub and the second hub comprises using an optical fiber winder without manually saturating the first coil with an adhesive.

* * * * *